United States Patent [19]

Goldman

[11] 4,149,246
[45] Apr. 10, 1979

[54] SYSTEM FOR SPECIFYING CUSTOM GARMENTS

[76] Inventor: Robert N. Goldman, P.O. Box 1186, Kailua, Hi. 96734

[21] Appl. No.: 914,301

[22] Filed: Jun. 12, 1978

[51] Int. Cl.² .................. G06F 3/14; G06F 3/02; G06F 3/04
[52] U.S. Cl. .................................................. 364/200
[58] Field of Search ... 364/200 MS File, 900 MS File; 121/112.12

[56] References Cited

U.S. PATENT DOCUMENTS

| | | | |
|---|---|---|---|
| 3,391,392 | 7/1968 | Doyle | 364/900 |
| 3,529,298 | 9/1970 | Lourie | 364/200 |
| 3,566,365 | 2/1971 | Rawson et al. | 364/200 |
| 3,765,349 | 10/1973 | Gerber | 112/121.12 X |
| 3,766,528 | 10/1973 | Ichida | 364/900 |
| 3,887,903 | 6/1975 | Martell | 364/200 |
| 3,895,358 | 7/1975 | Pearl | 364/900 |

OTHER PUBLICATIONS

Graphic Displays for Computer-Assisted Marker Making-vol. IV, No. 4, 1970, Article 39, pp. 1-9, of The Journal of the Apparel Research Foundation, Inc.

*Primary Examiner*—Harvey E. Springborn
*Attorney, Agent, or Firm*—Nilsson, Robbins, Dalgarn, Berliner, Carson & Wurst

[57] ABSTRACT

A system is disclosed for creating custom garments of clothing for a wearer by combining data on personal tailoring measurements of the wearer, physical characteristics of the wearer, a garment pattern, and garment options selected on the basis of the resulting combination of personal and pattern data. As disclosed, the system is embodied with a central location unit including a cutting table apparatus, a memory for a substantial number of patterns, and a pattern-processing system. The central unit serves a plurality of remote location equipments through a communication system which may incorporate a telephonic link. The remote equipments include an interactive graphic display terminal which cooperates with a remote location computer for the effective combination of physical data, personal selection data, and pattern data. As disclosed, an operator customizing a garment (typically the intended wearer) selects a garment pattern from storage at the central location unit with the result that display data on the pattern is recorded in the location equipment. Personal physical data is also supplied to the location equipment and the two forms of data are combined to provide data representative of the combination. The resulting combination, with certain designer limitations, is then formulated for an interactive graphic display forming the basis for optional variations, some of which may be selected by the operator. In the final analysis, the combined data (pattern, physical measurements, and individual selections) are manipulated by the system to provide: (1) data for a current graphic display, and (2) specific pattern data. Upon confirmation, the specific pattern data is processed to control a central-location cutting table apparatus to provide the components which are sewn together to accomplish the designed garment.

12 Claims, 4 Drawing Figures

SYSTEM FOR SPECIFYING CUSTOM GARMENTS

BACKGROUND AND SUMMARY OF THE INVENTION

Variations in the physical size and the personal taste of people has long plagued the clothing industry. Most generally, the solution to the problem has been to produce a range of sizes for garments which hopefully will satisfy the personal tastes of many individuals. Although the clothing industry has effectively accommodated to that practice, it has not been without substantial difficulties both to the industry and the market. First, many purchasers of standard-size garments are faced with the alternative of tolerating some compromise in the fit of the garment or alternatively bearing the cost of expensive alterations. Another common compromise involves a multitide of fabric and style variations. That is, purchasers frequently buy a garment simply because it is the closest thing available to what is truly desired. As for the clothing industry, anticipating and accommodating the style desires of the multitude of purchasers not only requires considerable study but substantial waste. A considerable volume of garments must be discounted for sale, because they are not of a style or size to attract a buyer. These considerations generally result in a relatively volatile industry and a substantially compromising market.

In general, the present invention may be embodied to provide an interactive graphics display which is used to facilitate the design and pattern for a garment with the result that a person can effectively consider a garment before it is actually fabricated. The system enables professionally designed garments custom styled by the purchaser using a mirror image display.

Structually, the system of the present invention incorporates an interactive graphic display terminal from which an operator (normally the intended wearer) provides physical data and a garment selection. A central storage responds to the identification of a garment by providing display data to the active terminal, which is related and scaled to the wearer's physical data to provide a display of the specific garment on the subject for whom it is being designed. The terminal equipment includes interactive graphics apparatus for developing the garment with the aid of a current image along with message instruction displays. A working storage actively carries limitations imposed on the garment by the designer, options for the garment, display data, and physical characteristics of the propspective wearer.

When the operator has attained the garment in the desired form, definitive data for such garment is transmitted to the central location unit for use in cutting the pattern for the garment's production. Consequently, the operator is able to work with data that reflects a clothing designer's capability, the wearer's own physical measurements and personal tastes, for specifying the desired garment prior to manufacture.

BRIEF DESCRIPTION OF THE DRAWINGS

In the drawings, which constitute a part of this specification, an exemplary embodiment demonstrating the various objectives and features hereof is set forth as follows.

DESCRIPTION OF ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specific structural and functional details disclosed herein are merely representative, yet in that regard they are deemed to provide the best embodiment for purposes of disclosure and to provide a basis for the claims herein which define the scope of the present invention.

Figure 1:
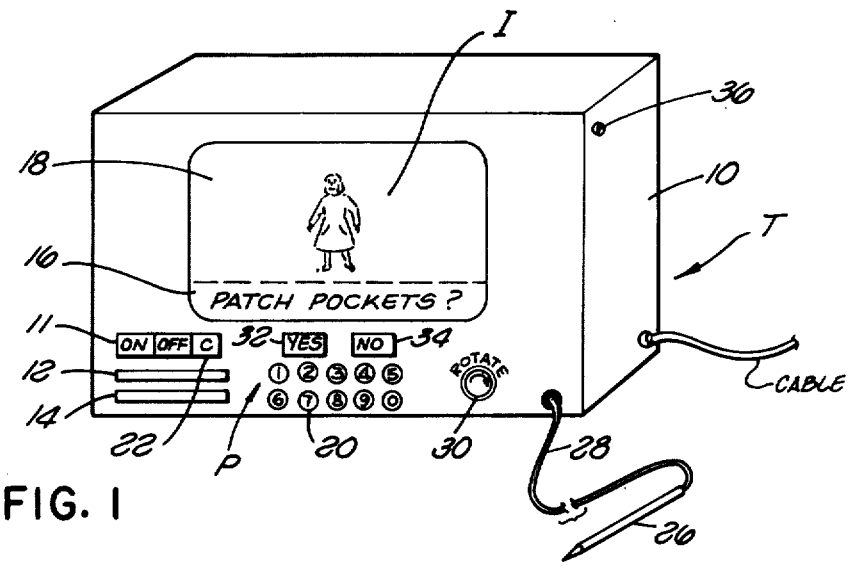
FIG. 1 is a perspective view of a terminal portion of a system constructed in accordance with the present invention.

Referring initially to FIG. 1, an individual terminal unit T is depicted with an input panel P and an image display screen I. In general, the operation of the system involves an operator or user working with the controls of the panel P aided by the images on the display screen I to attain the detailed specification of a garment which is then created in a physical form as described below.

As depicted in FIG. 1, the terminal unit T is unitarily housed in a cabinet 10 for convenient viewing of the screen I and manipulation of controls on the panel P. Considering the structure, an appreciation of the function performed may now best be accomplished by pursuing a description of the manner in which the system is employed to specify a desired garment. Accordingly, assume that the person operating or using the system (by operating the terminal of FIG. 1) is the intended wearer of the garment to be specified, and possesses a magnetic-stripe card carrying physical information both with respect to graphic display data and garment measurements. Recognizing that a variety of possibilities may be employed, it has been determined that a plastic card bearing a magnetic strip as well known in the art may be coded to effectively carry the desired information. Specifically, 104 digits are recorded on the magnetic stripe using an eight-digit identification number along with 32 measurements (three digits per measurement). An effective format for the measurements has been determined to be: six digits for standard tailoring measurements, nineteen special body measurements for a highly accurate fitting (optional), and seven head measurements to provide a silhouette profile viewable from the front, side, or rear of the subject. It is to be noted that the seven head measurements are not employed for the garment fitting or specification, but rather only for the graphics display of the person.

After activating the terminal T by depressing an "ON" button 11, the plastic card (not shown) bearing magnetically recorded data as indicated above is entered in the cabinet 10 through a slot 12 and returned from a slot 14. In its travel between the slots 12 and 14, the magnetic card is sensed to provide both display data and garment-measurement data for the person.

After the card exits from the slot 14, a message portion 16 of the screen I exhibits the instruction "KEY IN PATTERN NUMBER". During this time, a graphics portion 18 of the screen I is blank, presenting no image.

Responding to the instruction displayed by the message portion 16, the user selectively depresses numerical keys 20 to identify the garment desired for consideration. Normally, the identification number is taken from a catalog of garments containing a simple representation of the garment and an identification number.

As the next occurrence in the sequence, the message portion 16 of the image screen I displays the instruction: "KEY IN FABRIC NUMBER". In response to such an instruction, the user employs the keys to key in a number identifying a particular fabric for the graphics display. Again, the source of the number may be a catalog or book of fabric samples.

With the entry of the garment and fabric numbers into the system, communication is established from the terminal T to a central station (not shown in FIG. 1) to obtain the display data for the garment along with options and design data. Recapitulating to some extent, the terminal now registers physical display data and physical garment measurement data for the subject, and display data as well as specification data for the garment being contemplated.

The equipment at the location of the terminal T under consideration next processes the data as described in detail below initially to determine whether or not the garment under consideration is appropriate for the subject under consideration. That is, in certain instances, garments may be designed with certain limitations, for example, certain garments may not be considered to be satisfactory by the designer for persons possessing certain measurements. If such an inappropriate selection is made, the message portion 16 of the screen I exhibits the message "NOT RECOMMENDED". Alternatively, if the wearer's physical characteristics meet the criteria imposed by the garment designer, then a display appears on the graphics portion 18 of the screen I showing the selected garment in the selected fabric on a representation of the subject.

It is to be noted that in the event that the operator either makes a mistake or decides against the garment specified, the entire operating sequence can be negated by depressing a cancellation button 22 bearing the legend "C". If desired, the operator can then begin again with a fresh start.

During the operation after the initial presentation of the garment on the wearer, the system and the operator cooperate to resolve certain individual choices with respect to garment options. Recognizing that such choices may vary considerably, the example of a dress hemline will be treated as initially illustrative. Accordingly, along with the graphics display on the screen I, the message portion 16 will indicate the legend: "DRAW HEMLINE WITH POINTER". The instruction refers to the use of an electronic wand or marker 26 which is attached to the cabinet 10 by a cable 28. The instructed operation consists of using the marker 26 to draw a line at the desired hemline of the garment as depicted. After a brief delay, the graphic portion 18 of the screen I displays an image reflecting the garment with the selected hemline.

In order to better appreciate the garment on the subject, the image depicted by the graphics portion 18 of the screen I may be revolved to exhibit side views as well as a rear view of the composite. Specifically, a knob 30 is provided in the panel P which may be turned to rotate the displayed figure. Accordingly, the user may clearly view the composite figure, perhaps even more effectively than in using mirrors to view an actual garment being worn. The composite image may be rotated at any time during the subsequent displays that occur in the course of sepcifying the desired garment.

From the present stage of operation, the user of the system is provided a number of individual options which are afforded depending upon the design, the wearer's physical form, and specification criteria. For example, considering a pair of trousers, the user may be given the rather routine choice of: "CUFFS ON THE TROUSERS?" Pursuing such an example, the question would be exhibited on the message portion 16 of the screen I. In response to the query, the user would selectively push either the button 32 (yes) or the button 34 (no). Thereafter, additional options or choices may be presented for the user in specifying the garment ultimately to be fabricated.

In a somewhat more refined operation of the system, the garment designer may provide options which are directly related to the physical characteristics of the person for whom the garment is being specified. For example, the garment might be well suited with either patch pockets or slash pockets for certain persons who fall within a specified range of physical characteristics. However, using the designer's criteria, the garment may be satisfactory only with slash pockets for persons outside the specified range. Under such circumstances, the garment may be exhibited in the graphics portion 18 of the screen I with slash pockets. Then, depending on the subject under consideration, the option may or may not be provided by concurrently having the message portion 16 of the screen I pose the question: "PATCH POCKETS?" If appropriate, according to the designer, the operator is afforded a choice. That choice is conditioned upon the garment designer imposing the limitations. As indicated above, the latitude may vary considerably; however, it is apparent that designer-quality can be imposed by restricting the flexibility of a specific garment depending upon the physical characteristics of the wearer.

The number of individual option provided with respect to a particular garment may vary considerably; however, in the operation of the system when the options are resolved, the ultimate garment is displayed in the graphics portion 18 of the screen I. At that stage, the message portion 16 carries the legend: "COMPLETE?" If the user desires to accept the design, the "yes" button 32 is depressed which prompts the message portion 16 to display an instruction "HAVE CLERK APPROVE". The user then summons an attendant to conclude the transaction. Essentially, the attendant will complete the financial transaction and actuate the system to proceed with the creation of the specified garment. In the latter regard, the attendant simply turns a key (not shown) in a key hole 36 which instructs the system to proceed. As will be described in greater detail below, such action results in a pattern being cut of fabric for the garment which then may be sewn together using conventional techniques to provide a custom-specified garment.

In view of the above preliminary consideration, it may be seen that the system of the present invention enables the custom specification of garments thereby reducing the speculative aspect of traditional garment industry producton. That aspect along with inventory considerations result in economies which bode well in an economic consideration of the present system in providing custom garments.

Figure 2:
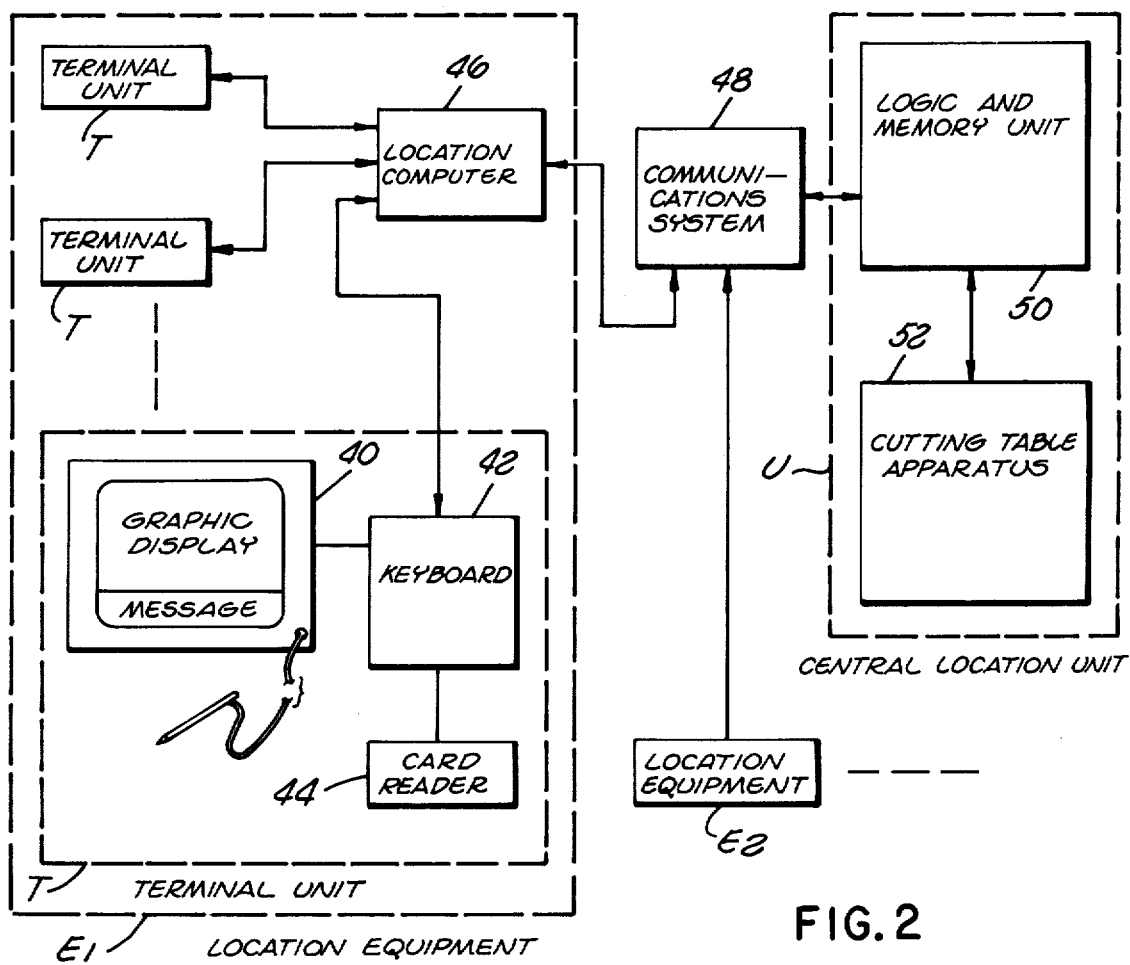
FIG. 2 is a block diagram of a system constructed in accordance with the present invention.

In view of the above somewhat-functional description of the system of the present invention, an appreciation of the system components may now be accomplished by considering such components as depicted in FIG. 2 illustrating the total system. The terminal unit T of FIG. 1 is depicted as one of several such terminal units T one of which is illustrated in the form of separate well known components including an interactive graphic display unit 40, a keyboard 42, and a magnetic card reader 44.

The terminal units T (which may vary in number) share a location computer 46 which constitutes essentially the remainder of the location equipment. The location computer 46 as disclosed in detail below serves the individual terminal units T to perform the data manipulations involved in developing the specifically desired garment. A multiplicity of structures for time sharing the location computer 46 among the terminals T are well known in the prior art, and in that regard a select one of various multiplexing schemes and structures is incorporated in the location computer 46.

The location equipment (comprising a number of terminals T) would normally be the installation at a single retail facility. In that manner, a number of prospective purchasers could be working individually at separate terminals served by a single location computer. A plurality of location equipments, $E_1$, $E_2$, and so on are illustrated in FIG. 2, each connected to a communication system 48. Again, a variety of time sharing structures or multiplexers are well known in the prior art. In that regard the communication system 48 incorporates a well known structure for sequencing or otherwise treating data from the location equipments $E_1$, $E_2$, and so on for communication with apparatus comprising the central location unit U. Specifically, the communication system 48 may include a telephone link, along with modems to provide communication between the individual location equipments E and a central location unit U. Specifically, the communication system 48 communicates with a logic and memory unit 50 which in turn communicatively controls a cutting table apparatus 52.

The unit 50 may take various forms of pattern scaling and designing systems specifically including structures as available from Camsco, Inc. of Richardson, Texas, or California Computer Products, Inc. of Anaheim, California. Certain aspects which may be incorporated in the unit 50 are described in U.S. Pat. No. 3,391,392 entitled "Method and Apparatus for Pattern Data Processing".

The unit 50 accomplishes a variety of functions. A sizable storage capability in the unit 50 registers garment display data and garment specification data for a substantial number of individual garments. The garment specification data includes not only basic patterns but data with respect to options as applicable in a limited manner to individual measurements as described in detail below. Furthermore, the unit 50 includes the capability to grade a specified garment in order to generate and provide pattern data for specific personal measurements as developed during the operation of the system, complete with various options.

Upon developing the final pattern data, the unit 50 sequences the data for driving the cutting table apparatus which responds to cut the detailed pattern for the desired garment. In that regard, the cutting table apparatus 52 may take the form of an automated water jet cutting system available from Camsco, Inc., Richardson, Texas, aspects of which are described in U.S. Pat. No. 3,978,748. The system as well known in the prior art can be configured with a variety of material feeding systems whereby a select fabric or material is supplied to the cutting table for cutting by a moving water jet.

Considering the general flow of data signals in the system of FIG. 2, the communication system 48 is active during two occasions in dealing with the most-compact complete transaction. Specifically, if the communication system 48 incorporates a telephonic link, the line is seized initially to receive basic garment data at the location computer 46. If the garment so identified culminates in a completed transaction, the line is again seized to provide the detailed specifications of the garment from the computer 46 to the unit 50. Of course, it should be recognized that a customer may consider and work with more than one garment before a finalized garment is specified to be actually produced. Abortive design efforts simply involve purging the data indicative of a rejected garment.

Considering the flow of information in somewhat greater detail, it will be recalled that the location computer 46 receives signals specifying a fabric and a garment by number from a terminal unit T. During the initial communication concerning the transaction, such data is transmitted by the communication system 48 to the unit 50 along with identification data indicating the location of the equipment E and the transaction number.

In response to receiving the initial data, the unit 50 provides signals representative of data on limitations of the garment, garment display data, and garment options. Although not disclosed in detail in the illustrative embodiment set forth herein, the system may also provide cost data so as to inform the prospective customer of pricing variations as well as the final price for a garment. With such data from the unit 50, the location computer drives the display unit 40 during the sequence of selections as described above to result in a precisely specified garment reflecting the designer criteria, the wearer's physical characteristics, and the individual tastes of the prospective purchaser. The structure for such operation is described below.

Upon completion of the specifications for a garment, there is another seizure of the telephone line (assuming the communication system 48 incorporates a telephonic link) during which signals representing the custom specifications for the garment (including selected optional features, fabric, and pattern identification) are communicated through the communication system 48 to the unit 50. Again, although not disclosed in the preferred embodiment, cost confirmation data may be provided from the unit 50 to the location computer 46 along with the anticipated delivery date.

It is to be noted that in the system of the illustrative embodiment, the basic pattern data for a garment is not transmitted from the unit 50 to the terminals T. Rather, the unit 50 withholds such basic pattern data which is graded, scaled, and customized with optional features after the garment is specified, to provide drive signals for the cutting table apparatus 52. The completion of the garment is effected by sewing together the various pattern components into a finished article of clothing. Normally, the operation will be performed under the direct manual control of a sewing machine.

Figure 3:
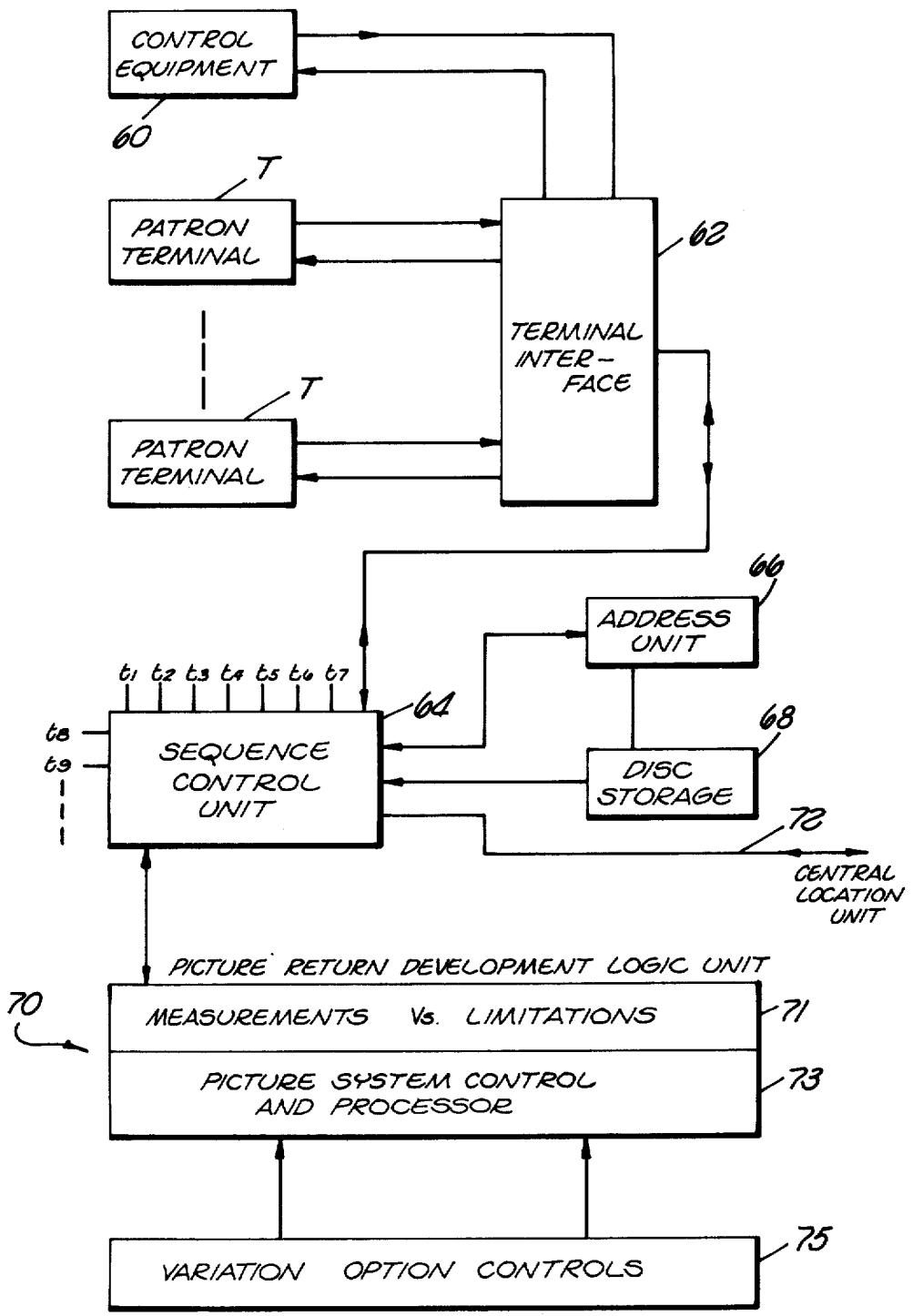
FIG. 3 is a block diagram of the remote location equipment of a system constructed in accordance with the present invention.

Considering the location equipment in somewhat greater detail, reference will now be made to FIG. 3 showing a plurality of terminal units T along with a control console 60 which has greater control flexibility along with the capability for certain ancillary modifications of the operating format. The terminals T along with the control console 60 are connected through a terminal interface 62 to a sequence control unit 64. Timing operations as well as data signal transfers are accomplished through the sequence control unit 64 which is connected to an address unit 66, an associated disc storage 68, and a pattern development logic unit 70 which incorporates a number of several different operating capabilities. Somewhat functionally considered, the logic unit 70 incorporates structure 71 for checking measurements of a subject against imposed limitations for the specific garment under consideration. Also, the unit 70 incorporates a picture system control and processor 73 which utilizes well known techniques from the field of interactive computer graphics. Still further, the unit 70 includes variation option controls 75 which drive the display apparatus to provide design queries answerable either by a "yes" or a "no" indication which serve to finalize the design specification of the garment.

In the course of sequencing the option of the location equipment as depicted in FIG. 3, the sequence control unit 64 provides a number of timing signals $t_1$ through $t_n$. The timing signals function to control gates and latches to maintain organization and logic for the operating sequence of processing data.

In general, the system as depicted in FIG. 3 broadly shows the elements of the location equipment. In that regard, the equipment may be variously configured as in a special purpose format to afford the capability of the individual blocks represented in FIG. 3. Essentially, assuming the operation of specifying a particular garment under control of an operator at one of the terminals T, after an initial interchange (through a communication channel 72) the disc storage 68 contains data signals representative of several items of information. Specifically, the storage 68 contains information on limitations for the garment, display data for the garment, options for variations on the garment, the clothing measurements of the subject, and the personal display data for the subject.

As the sequence of operation progresses through the individual stages manifest by the timing signals $t_1$-$t_n$ under control of the unit 64, logic operations are performed by the unit 70 which in due course develop the data to specify the desired garment in the disc storage 68. Specifically, the developed data includes: the garment and fabric identification, the transaction identification, the selected features for the garment, and the clothing measurements of the subject. The development of that data indicates the conclusion of a cycle of operations after which such data is transmitted through the line 72 to the logic and memory unit 50 (FIG. 2) for processing and development of signals to direct the cutting table apparatus 52 to provide fabric properly cut and sectioned for the garment.

It is to be noted that in addition to creating custom garments, the system of the present invention can be employed to provide clothing patterns of paper or the like, which are subsequently employed to manually produce the fabric for the desired garment. In one such situation, a consumer may desire a pattern from which a plurality of similar garments will be produced, as with different fabrics.

Figure 4:
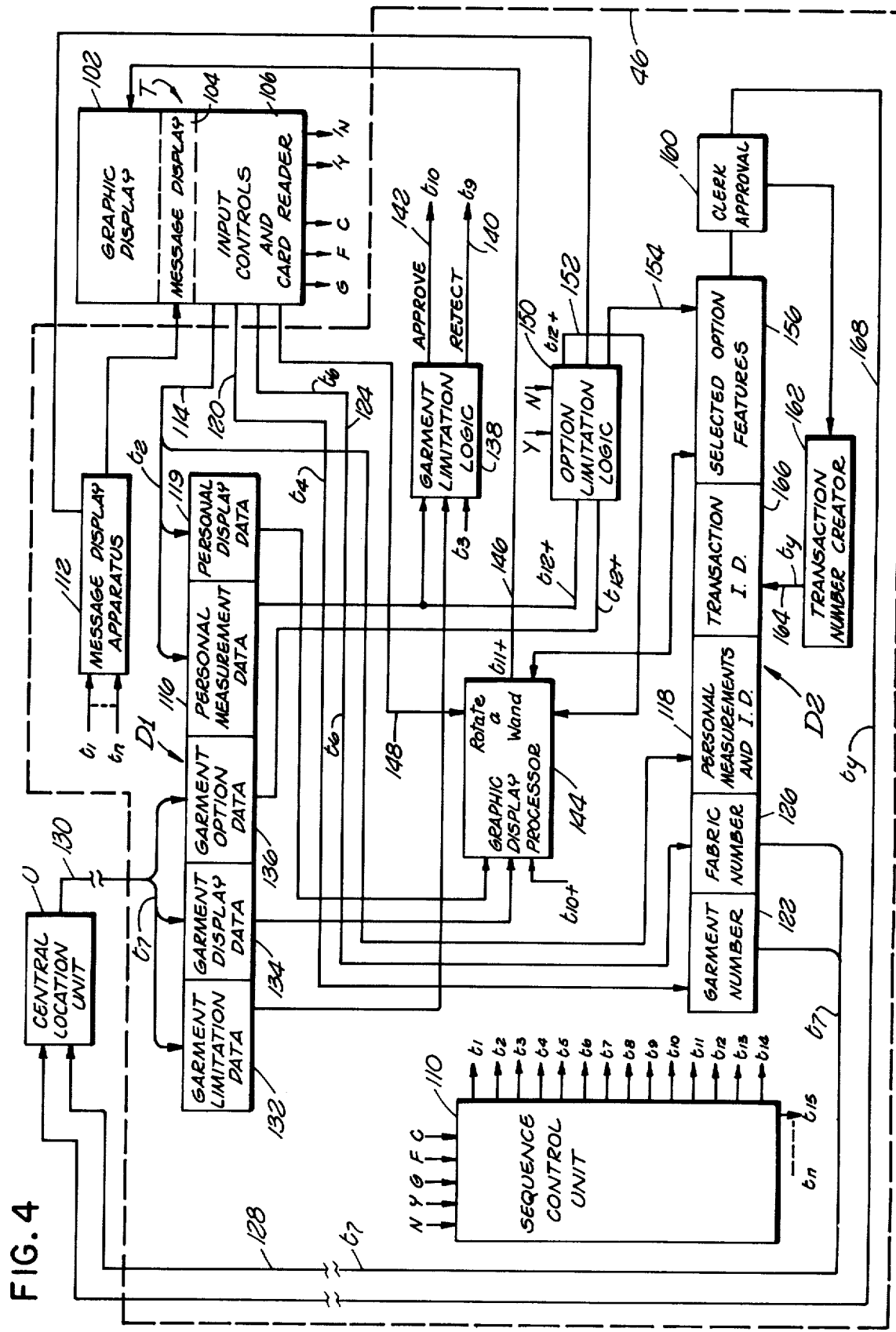
FIG. 4 is a block diagram of the processing unit in location equipment of a system constructed in accordance with the present invention.

Recognizing the complexity of the system of FIG. 3, and the vast volume of material required for an ultimately detailed description, the illustrative embodiment is treated with reference to operating registers and flow paths, as disclosed in FIG. 4. Such a disclosure will enable a person of ordinary skill in the art to implement the system using a variety of available computer-related techniques. Specifically in that regard, the system described with reference to FIG. 4 will afford sufficient information to enable the person of ordinary skill in the art to implement the system using the elements as indicated in FIG. 3, i.e. disc storage, sequence control, and so on.

Referring now to FIG. 4, the operation is controlled in accordance with the following chart of binary signals, the occurrence of the "t" signals being in accordance with their associated number.

| Signal | Operation | Display (Message & Graphics) |
| --- | --- | --- |
| $t_1$ | Machine in standby state | "INSERT CARD" |
| $t_2$ | Register card data in storage and ID for transaction | -blank- |
| $t_3$ | Machine waiting garment data | "KEY IN GARMENT Number" |
| $t_4$ | Register garment number in storage | -blank- |
| $t_5$ | Machine waiting fabric data | "KEY IN FABRIC NUMBER" |
| $t_6$ | Register fabric number in storage | -blank- |
| $t_7$ | Interchange with central | -blank- |
| $t_8$ | Check pattern fabric and measurements for approval | -blank- |
| $t_9$ | Indicate garment unsuited to measurements or fabric | "GARMENT NOT RECOMMENDED" |
| $t_{10}$ | Process display data | -blank- |
| $t_{11}$ | Display basic composite and hemline question | -DISPLAY- "DRAW HEMLINE" |
| $t_{12}$ | Process display data | -blank- |
| $t_{13}$ | Display basic composite with adjusted hemline | -DISPLAY- "PATCH POCKETS?" |
| $t_{14}$ | Process display data | -blank- |
| $t_{15}$ | Display basic composite as developed with other options | -DISPLAY- |
| $t_x$ | Machine waiting spec. approval | -DISPLAY- "COMPLETE?" |
| $t_y$ | Establishment approval pending | -DISPLAY- |

-continued

| Signal | Operation | Display (Message & Graphics) |
|---|---|---|
| | | "FETCH CLERK TO APPROVE" |
| $t_n$ | Transfer data | "THANK YOU" |
| G | Turns system ON | -blank- |
| F | Turns system OFF | -blank- |
| C | Clears prior terminal activity | -blank- |
| Y | Yes | |
| N | No | |

Referring now to FIG. 4, the display terminal unit is symbolically represented by a block T at the upper right. The block T is segmented to indicate the graphic display portion 102, the message display portion 104, and the input portion 106.

The central location unit U is also illustrated in FIG. 4 (upper left) as a single block to represent the considerable equipment at the central location.

The balance of the structure represented in FIG. 4 is embodied in the location computer 46 (FIGS. 2 and 4) as depicted in FIG. 2. In that regard, the structure of FIG. 4 sets forth an operational system with a view toward attaining a detailed disclosure adequate for enabling a person or ordinary skill in the art to practice the invention; however, without the ancillary complications and details which may be embodied in commercial forms of equipment utilizing addressable storage and multiple equipments.

The operation of the system of FIG. 4 is sequenced under control of a sequence control unit 110 (lower left) which is connected to every block depicted in FIG. 4 (connections omitted for simplicity). The unit 110 provides the binary timing signals $t_1$-$t_n$ which are connected to various of the blocks indicated in FIG. 4 and additionally serve to gate information transfers between the blocks illustrated in FIG. 4. The structure and use of composite gate apparatus for controlling the transfer of signal-represented data is well known in the prior art. Consequently, in the interests of providing a simplified presentation, gating structures have not been shown in detail; rather, as full equivalents, the timing for transfers is indicated by signals labeling transfer lines where appropriate.

In view of the above preliminary description of the system of FIG. 4, an understanding thereof may now best be presented by assuming an initial state of events and explaining occurrences as the operation proceeds. Accordingly, assume initially that the system is energized awaiting use by an operator to individually develop a garment. Further assume that the operator is the intended wearer and has consulted garment and fabric catalogs and both a tentative garment and fabric have been selected. The operator then approaches the terminal unit T as depicted in FIG. 1 depressing the button 11 to place the terminal in an "on" state. As an initial action, the operator would next depress the "clear" button 22 thereby conditioning the system for a fresh cycle of operations. That action clears all registers illustrated in FIG. 4 preparatory to a fresh interval of operation.

With the machine in an initialized state, the sequence control unit 110 (FIG. 4, lower left) provides the signal $t_1$ high, indicating that the machine is ready for a cycle of operation. As indicated in FIG. 4, the timing signals are applied to a message display apparatus 112 (top central) which selectively provides signals to the message display portion 104 of the terminal to command select messages to be displayed. When the system is in the "ready" state (signal $t_1$ high) the message display apparatus 112 actuates the message display portion 104 with the instruction: "INSERT CARD". With respect to the apparatus 112, various forms of structures may be employed, an illustrative form of which may comprise a storage facility for signals to command predetermined alphanumeric displays each of which is uniquely selected to provide such signals by a select one of the timing signals t.

Acting on the exhibited instruction, the operator inserts a card as described above in the slot 12 through which the card is transported and the magnetic stripe thereon sensed to provide the represented data in the form of electrical signals. Various forms of card reading equipment are available; however, one form of such apparatus is available from Mag-Tek, Inc. of Carson, California.

The signals from the card are sensed by the portion 106 (FIG. 4) of the terminal T and provided through a cable 114 to be registered in sections of storage. Specifically, the signal-represented information includes: personal measurement data, personal identification, and personal display data as explained above.

During the time indicated by the timimg signal $t_2$ (the existence of the signal being identified as the time when that binary signal is in a high state) personal measurement data is transferred into a section 116 of a data storage $D_1$ as well as a section 118 of a data storage $D_2$. Also during the timing signal $t_2$, the personal identification from the card is also stored in the section 118. Additional information from the card in the form of the personal display data is registered in the section 119 of the data storage $D_1$.

Somewhat preliminarily, it will be understood that the data storage $D_1$ is operational storage for data that is used in the course of specifying the desired garment. Distinctively, the storage $D_2$ is for the data that is developed to be transmitted to the control location unit U for the fabrication of the desired garment.

At the conclusion of the timing interval $t_2$, the system enters a phase designated by the timing signal $t_3$ during which the message display portion 104 of the terminal T exhibits: "KEY IN GARMENT NUMBER". The signals for that message display are provided from the apparatus 112 to the terminal T which instructs the user to provide the garment number using the keys 20 (FIG. 1).

The garment number is passed through a line 120 from the terminal T to be registered in a signal-represented form during the interval of signal $t_4$ in a section 122 of the storage $D_2$. The completion of the operation prompts the sequence control unit 110 to advance to the state of the signal $t_5$ which actuates the message display apparatus 112 to cause the message display portion of the terminal to exhibit: "KEY IN FABRIC NUMBER". Responding to the instruction, the operator again uses the keys 20, in this instance to provide the fabric number. Representative signals are formed by the input apparatus in portion 106 and are passed through a line 124 during the interval $t_6$ to be registered in section 126 of the storage $D_2$.

With the registration of the fabric number in section 126 of the storage $D_2$, the sequence control unit 110 proceeds to the interval of the timing signal $t_7$ (note the above chart) during which the terminal apparatus is placed in communication with the central location unit U. As indicated above, such communication may involve a telephone link or other long distance facility and in that regard, breaks are indicated, as in the line 128 which carries signals representative of the garment number and the fabric number to the central location unit 108.

During the same time interval (period of binary signal $t_7$) the unit U provides the working data to the data storage $D_1$, for the selected garment from a stored catalog of such information. Specifically, during the interval of the signal $t_7$, the unit U provides return signals through a line 130 to register data in the data storage $D_1$. Specifically, signals representative of design limitations for the garment are stored in a section 132, signals representative of the garment display data are provided in a section 134, and signals indicative of garment options are placed in a section 136. Consequently, the data storage $D_1$ is loaded and the system is prepared to move forward in the operation of developing a specification for a desired garment. Consequently, the sequence control unit, in accordance with the above chart, advances to provide the timing signal $t_8$ defining an interval when the measurements of the subject are tested against limitations imposed by the garment designer.

The initial approval of the garment for the measurements of concern is accomplished by a garment-limitation logic unit 138 during the interval of the signal $t_8$. The unit 138 receives the personal measurement data from the storage section 136 along with garment limitation data from the storage section 132. In one form, the logic unit 138 may simply comprise apparatus for performing a number of digital magnitude comparisons between designer-imposed limits and the actual measurements of the subject. For example, it may be that a garment is designed with the objective of giving the wearer an appearance of being heavier than actually is the fact. Essentially, the garment would be worn by a thin person to give the appearance of greater bulk. Consequently, the designer may impose maximum waist-height proportions for persons who should wear the selected garment. In such an example, the waist-height ratio limitation from storage section 132 is compared with the actual waist-height ratio of the subject (received from the storage section 116). Should the actual waist-height ratio exceed the designer-limited waist-height ratio, a rejection signal is provided in the line 140 which prompts the sequence control unit 110 to indicate the timing signal $t_9$ manifesting that the garment is not satisfactory. Specifically, the timing signal $t_9$ applied to the message display apparatus 112 results in a display of: "GARMENT NOT RECOMMENDED" (see the above chart). A clearing operation would normally follow.

As an alternative to the above assumption, if the waist measurement (along with all other measurements compared) falls within the proper range for the proposed wearer, then a high signal appears in the line 142 which advances the sequence control unit 110 to provide the signal $t_{10}$ in a high state.

It is to be noted that the limitations and limitation comparisons for an individual garment may vary widely depending upon the objective of the garment designer. Consequently, it may be desirable to provide a format of several possible comparisons the failure of any of which will result in a rejection signal in the line 140; while the approval of all will result in an approval signal in the line 142. Various apparatus for the unit 138 may thus be used as well known in the prior art to perform the comparisons.

As indicated above, if the operator is advised that the selected garment is not satisfactory, the routine operation will be to clear the machine (press the clear button 22, FIG. 1) and initiate another cycle of operations with the selection of a different garment. However, if the garment is approved for the subject, the system functions to compute a graphic display during the interval of the timing signal $t_{10}$. Specifically, a graphic display processor 144 (FIG. 4 central) combines the garment display data from the storage section 134 with the personal display data from the storage section 119 during the period of signal $t_{10}$ develops graphic-display signals for a presentation of the specified person wearing the specific garment.

Various forms of apparatus capable of functioning as the graphic display processor 144 are well known, one form being available from United Computing Corporation, Carson, California. Upon computation of the display signals, they are held in a buffer register (not shown) of the processor 144. The sequence control unit then proceeds to the operating phase of the signal $t_{11}$ during which the display signals are repeatedly supplied through a line 146 to the graphic display portion 102 of the terminal T. Note that during the entire interval of $t_{11}$, the display is maintained by rejuvenating transmission of the display signals through the line 146. During such a DISPLAY stage (or any subsequent DISPLAY stage as indicated in the above chart) the knob 30 (FIG. 1) may be turned to cause the image to revolve thereby affording the operator a view of the subject wearing the garment in a mirror-image presentation. That is, the image can be turned to reveal side and back views.

During the initial display, the message portion of the terminal T is also active. Specifically, the message: "DRAW HEMLINE" is exhibited. This message instructs the user to employ the wand or marker 26 (FIG. 1) to indicate hemlines on the garment. Specifically, for example, in the case of a dress, a line designating the desired hemline is simply drawn on the screen I. Alternatives include cuff length, sleeve length, and so on.

With the completion of the hemline information, the system enters the next phase defined by the timing signal $t_{12}$ from the sequence control unit 110. During that interval, the processor 144 processes the hemline data into the existing display and provides a fresh set of data in the output buffer register advancing the sequence to the interval of the timing signal $t_{13}$. During such time interval, the composite image is again presented on the graphic display portion 102 of the terminal T, now with the hemline information incorporated.

During the interval of the timing signal $t_{13}$, in addition to the composite graphic display, the message display is also active indicating the first of what may comprise several individual garment options. In accordance with the above sequence chart, assume that the option is to modify the garment from its presently pictured form to a form in which it has patch pockets. Thereupon, during the interval of timing signal $t_{13}$, in addition to the graphic display in portion 102 of the terminal T, a message display is provided in portion 102 stating: "PATCH POCKETS?".

The logic networks implementing approval or disapproval of the individual options is embodied in a logic unit 150 (FIG. 4 central) which receives the garment option data from the storage section 136 and the personal measurement data from the storage section 116. In general, options in the specification of the formal garment are provided depending upon the personal measurements of the subject involved. To consider the illustrative example, persons of measurements in a certain range perhaps should not wear the garment with patch pockets. Of course, these are designer considerations and will be provided in the data registered in section 136 of the storage $D_1$. The comparison information is provided by the personal measurements data from the section 116 of the storage section $D_1$, both such data signals being supplied to the option limitation logic unit 150 for processing. If an option passes the designer imposed tests, it is offered to the operator as described above with respect to the option "PATCH POCKETS?". If the limitations indicate that the option is inappropriate, it is simply not offered and the system moves on to the next option for consideration during the following timing cycle.

The provision of an option invites either a "yes" or a "no" to be indicated by the buttons 32 and 34 (FIG. 1) which result in a signal Y or N applied to the unit 150 either accepting or rejecting the option. If the option is accepted, that fact is indicated to the graphic display processor through a line 152 and additionally is registered through a line 154 in a section 156 of the data storage $D_2$. After such an event, the next phase of operation is entered (indicated by the signal $t_{14}$ in accordance with the above chart) during which the processor modifies the composite display data. Thereafter, the updated composite display is again made as previously described; however, in the present instance with the modification of the offered option. Of course, depending upon the number of options available, the system may repeat the above cycle several times. Upon the conclusion of the last offered option, the sequence control unit passes to a timing signal $t_x$ which initiates the concluding phases of specifying the custom garment.

Considering the concluding phases in detail, during the interval indicated by the timing signal $t_x$, the ultimate composite image is displayed of the subject clad in the specified garment. Of course, that display is in the graphic display portion 102 of the terminal T. Concurrently, the message portion carries the legend "COMPLETE?". If such is the case, the operator depresses the "yes" button 32 (FIG. 1) which advances the sequence control unit to the timing signal $t_y$ during which the graphic display does not change; however, the legend is modified to state: "FETCH CLERK TO APPROVE". Acting upon such an instruction, the operator summons a clerk who makes the final arrangements of the transaction, mode of payment, and so on, then finalizes the specification of the designed garment by placing a key in the keyway 36 (FIG. 1) and actuating an approval circuit 160 (FIG. 4 lower right).

Prior to transferring the contents of the data storage $D_2$ to the central location unit, the approval circuit 160 actuates a transaction number generator 162 which simply generates coded numbers in sequence and registers the current number through the line 164 in section 166 of the data storage $D_2$. Thereafter, the approval circuit 160 gates the entire contents of the data storage $D_2$ through a line 168 to the central location 108. Specifically, the central location receives data indicating: the garment number, the fabric number, personal measurements of the subject and his identification, the identification of the transaction (which may be coded to the store), and selected option features of the garment. With such information, the logic and memory unit 50 (FIG. 2) develops signals for indicating individual fabric pieces or pattern components which are then specified to the cutting table apparatus 50 and accordingly the desired garment is cut. As indicated above, the cut pattern pieces are then sewn or otherwise joined to provide the specified garment which is in due course delivered to the customer.

In view of the above description, it may be seen that the system may be effectively used to specify and create custom garments for individuals which reflect not only designer capability but individual physical characteristics and personal preferences of the wearer. Of course, the system may be variously implemented and variously used depending upon designer criteria, garments, communication systems employed, and marketing techniques. Accordingly, the scope hereof shall not be referenced to the disclosed embodiment but on the contrary, shall be determined in accordance with the claims as set forth below.

What is claimed is:

1. A system for detailed specification of a garment of clothing, comprising:

memory means for data definitive of specific garments;

input means for providing personal data signals on a proposed wearer of the garment and for identifying a selected garment to said memory means to provide garment signals for said selected specific garment;

means for combining said personal data signals and said signals for said select specific garment to provide data representative of said combination; and means for manifesting said data representative of said combination for manual approval.

2. A system according to claim 1 further including means for associatively grading said personal data signals to said signals for said select specific garment to provide a detailed specification.

3. A system according to claim 1 wherein said means for combining includes means for testing said personal data signals in relation to said signals for said selected specific garment to test compliance with predetermined limits.

4. A system according to claim 1 further including means for providing signals indicative of decisions in relation to optional choice features for said specific garment as indicated by said means for manifesting.

5. A system according to claim 1 wherein said means for manifesting includes a display means for providing images representative of said combination.

6. A system according to claim 5 further including means for providing images on said display means representative of the physical appearance of said wearer.

7. A system according to claim 1 wherein said manifesting means includes a graphic display for providing images of a person defined by said personal data signals, wearing said selected specific garment.

8. A system according to claim 1 wherein said input means and said means for manifesting comprise an interactive computer graphics terminal including a visual display means for providing images of a person defined by said personal data signals, wearing said selected specific garment.

9. A system according to claim 8 wherein said terminal is remote from said memory means.

10. A system according to claim 9 further including with said memory means, means for associatively grading said personal data signals to said signals for said select specific garment to provide a detailed specification.

11. A system according to claim 10 further including with said memory means, means for cutting fabric for said select garment in accordance with said detailed specification.

12. A system according to claim 11 including a plurality of said terminals for operation in said system.

* * * * *

UNITED STATES PATENT AND TRADEMARK OFFICE
CERTIFICATE OF CORRECTION

PATENT NO. : 4,149,246
DATED : April 10, 1979
INVENTOR(S) : Robert N. Goldman

It is certified that error appears in the above-identified patent and that said Letters Patent are hereby corrected as shown below:

Column 1, line 37, "Structually" should be --Structurally--;

Column 2, line 8, before "location" should be --the remote--;

Column 4, line 5, "sepcifying" should be --specifying--;

Column 4, line 43, "option" should be --options--;

Column 4, line 46, after "displayed" "in" should be --on--;

Column 4, line 67, "producton" should be --production--;

Column 7, line 23, "option" should be --operation--;

Column 8, line 67, before the line beginning with "$t_x$" there should be a line containing only three dots, i.e. --. . .--;

Column 9, line 25, before "ordinary" "or" should be --of--; and

Column 14, line 1, after "through" "the" should be --a--.

Signed and Sealed this

Thirty-first Day of July 1979

[SEAL]

Attest:

LUTRELLE F. PARKER
Attesting Officer  Acting Commissioner of Patents and Trademarks